(12) United States Patent
Totsuka

(10) Patent No.: US 11,006,018 B2
(45) Date of Patent: May 11, 2021

(54) IMAGE READING APPARATUS THAT READS ORIGINALS, CONTROL METHOD THEREFOR, AND STORAGE MEDIUM

(71) Applicant: CANON KABUSHIKI KAISHA, Tokyo (JP)

(72) Inventor: Satoshi Totsuka, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/665,148

(22) Filed: Oct. 28, 2019

(65) Prior Publication Data

US 2020/0137259 A1 Apr. 30, 2020

(30) Foreign Application Priority Data

Oct. 30, 2018 (JP) .............................. JP2018-204139

(51) Int. Cl.
*H04N 1/32* (2006.01)
*H04N 1/00* (2006.01)

(52) U.S. Cl.
CPC ....... *H04N 1/3263* (2013.01); *H04N 1/00411* (2013.01); *H04N 1/00652* (2013.01)

(58) Field of Classification Search
CPC .......... H04N 1/00588; H04N 1/00708; H04N 1/00726; H04N 1/00771; H04N 1/00917; H04N 1/3263; H04N 2201/0094; H04N 1/00411; H04N 1/00652; H04N 1/38; H04N 1/409; H04N 1/4095; H04N 1/4097; H04N 1/00734; H04N 1/00748; H04N 1/0075; H04N 1/00795; H04N 1/215; H04N 1/193; H04N 1/40; H04N 1/58; H04N 2201/044; H04N 1/00002; H04N 1/00037; H04N 1/0005; H04N 1/00063; H04N 1/00068; H04N 1/00092; H04N 1/00801;
(Continued)

(56) References Cited

U.S. PATENT DOCUMENTS 6,252,680 B1 * 6/2001 Schweid ................... H04N 1/38
358/462
6,760,048 B1 * 7/2004 Bates ...................... G06F 3/0481
715/781
(Continued)

FOREIGN PATENT DOCUMENTS

EP 0631425 A2 12/1994
JP H0624604 A 2/1994
JP 2018087836 A 6/2018

OTHER PUBLICATIONS

Extended European Search Report issued in European Appln. No. 19205421.1 dated Mar. 19, 2020.

*Primary Examiner* — Negussie Worku
(74) *Attorney, Agent, or Firm* — Rossi, Kimms & McDowell LLP

(57) ABSTRACT

An image reading apparatus which is capable of preventing occurrence of a paper jam and poor stacking during conveyance of originals. The image reading apparatus sets a type of an original, conveys the original based on the set type of the original, and reads an image on the conveyed original. An original detecting sensor detects placement of the original on an original tray. An LCD touch panel displays an object for setting a type of the original in response to the detection by the original detecting sensor.

12 Claims, 11 Drawing Sheets

(58) Field of Classification Search
CPC ......... H04N 2201/0422; H04N 1/0057; H04N 1/00578; H04N 1/00716; H04N 1/23; H04N 1/2323; H04N 1/32609; H04N 1/263; H04N 1/32646; H04N 1/00806; H04N 1/08215; H04N 1/0408; H04N 1/0058; H04N 1/00591; H04N 1/00631; H04N 1/32203; H04N 1/32256; H04N 1/32304; H04N 1/32352; G01N 21/33; G01N 21/35; G01N 21/3563; G01N 21/8851; G06F 2203/04803; G06F 3/0481; G06F 9/542; G06F 19/321; G06F 19/3481; G06F 30/13; G06T 5/20; G06T 5/40; G06T 11/00; G06T 11/60; G06T 19/006; G06T 19/20; G06T 2210/04; G06T 2210/41; G06T 2219/024; G06T 2219/028; G06T 2219/2021; G09G 5/14; B65H 2406/323; B65H 5/224; B65H 9/06; G03B 27/625; G03B 27/6235; B41J 3/60; B41M 3/10; G03G 15/602; G03G 15/605; G16H 30/40; G16H 40/67; G16H 80/00; H04L 12/1822

USPC .......................................................... 358/498
See application file for complete search history.

(56) References Cited

U.S. PATENT DOCUMENTS

| | | | |
|---|---|---|---|
| 2002/0071131 A1* | 6/2002 | Nishida | H04N 1/4095 358/1.9 |
| 2002/0126299 A1* | 9/2002 | Buchar | H04N 1/00748 358/1.9 |
| 2016/0188261 A1* | 6/2016 | Totsuka | H04N 1/00567 358/1.13 |
| 2016/0191735 A1* | 6/2016 | Mutsuno | H04N 1/00689 358/1.14 |
| 2017/0013138 A1* | 1/2017 | Muraishi | H04N 1/00803 |
| 2017/0090841 A1* | 3/2017 | Totsuka | G06F 3/1267 |
| 2018/0054538 A1* | 2/2018 | de Echaniz | H04N 1/00912 |
| 2018/0084153 A1* | 3/2018 | Totsuka | G06F 3/1203 |
| 2018/0160000 A1* | 6/2018 | Takahashi | H04N 1/00896 |
| 2018/0160008 A1* | 6/2018 | Osada | H04N 1/00726 |
| 2019/0068811 A1* | 2/2019 | Totsuka | H04N 1/00472 |
| 2019/0286391 A1* | 9/2019 | Totsuka | G06F 3/1232 |

* cited by examiner

IMAGE READING APPARATUS THAT READS ORIGINALS, CONTROL METHOD THEREFOR, AND STORAGE MEDIUM

BACKGROUND OF THE INVENTION

Field of the Invention

The present invention relates to an image reading apparatus, a control method therefor, and a storage medium.

Description of the Related Art

An image forming apparatus that reads originals conveyed from an automatic original conveying device is known. In the image forming apparatus, when an original is read, a variety of problems occur, depending on a thickness of the original. For example, when an original conveyed from the automatic original conveying device is a thick sheet, a high load is applied to conveying rollers in a curved area of a conveying path, causing a paper jam. When an original conveyed from the automatic original conveying device is a thin sheet, it takes time for a discharged original to drop entirely onto a sheet discharging unit because the original itself is light in weight, and hence a trailing end of the original hits a leading end of a succeeding original, causing a paper jam or poor stacking. Conventionally, to prevent occurrence of a paper jam and poor stacking during conveyance of an original as described above, a thickness of the original is detected by a sensor, and a conveying speed of the original is controlled according to the detected thickness (see, for example, Japanese Laid-Open Patent Publication (Kokai) No. H06-24604).

There is another problem that when an original read by the image forming apparatus is a thin sheet, letters or images on the reverse side show through, and image data or printed matter with the letters or images on the reverse side showing through (hereafter referred to as "show-through data") is output. To address this problem, an image forming apparatus with a show-through prevention function has been developed. When the show-through prevention function is enabled by user's setting, this image forming apparatus performs image processing on scanned-in image data to remove show-through.

The setting on the show-through prevention function is configured by a user, but the user does not notice that letters or images on the reverse side show through until he or she actually sees image data or printed matter that has been output. For this reason, when an original to be read is a thin sheet, reading is started often before the show-through prevention function is enabled. As a result, output of show-through data cannot be reliably prevented even though occurrence of a paper jam and poor stacking during conveyance of an original can be prevented.

SUMMARY OF THE INVENTION

The present invention provides an image reading apparatus and a control method therefor, which are capable of preventing occurrence of a paper jam and poor stacking during conveyance of an original, as well as a storage medium.

Accordingly, the present invention provides an image reading apparatus including an original tray, a setting unit that sets a type of an original, a conveyance control unit that controls conveyance of the document by a conveying unit based on the type of the original set by the setting unit, and a reading unit that reads an image on the original conveyed by the conveying unit, comprising a detecting unit configured to detect that the original has been placed on the original tray, and a display unit configured to display an object for setting a type of the original in response to the detecting unit detecting that the original has been placed on the original tray.

According to the present invention, occurrence of a paper jam and poor stacking is prevented during conveyance of an original.

Further features of the present invention will become apparent from the following description of exemplary embodiments (with reference to the attached drawings).

DESCRIPTION OF THE EMBODIMENTS

Figure 1:
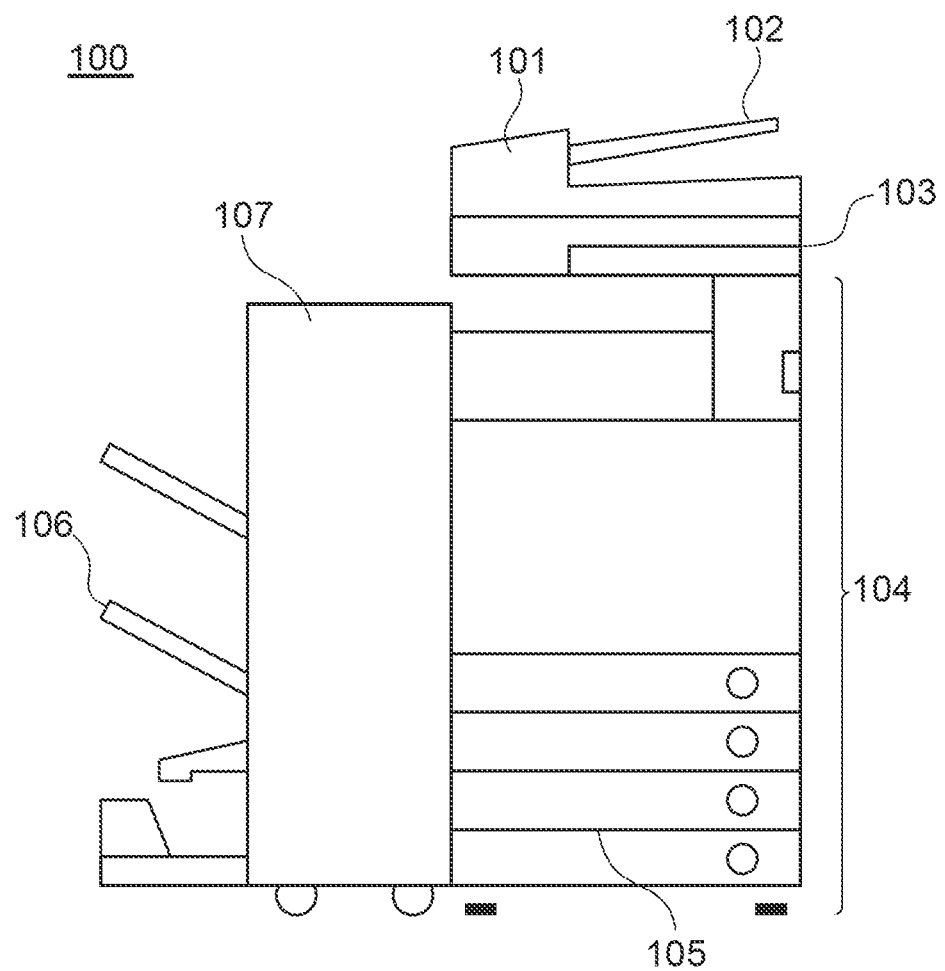
FIG. 1 is an external view of an image forming apparatus which is an image reading apparatus according to an embodiment of the present invention.

An embodiment of the present invention will now be described in detail with reference to the drawings. FIG. 1 is an external view of an image forming apparatus 100 which is an image reading apparatus according to an embodiment of the present invention. The image forming apparatus 100 has an automatic document feeding unit 101, an image reading unit 103, and an image forming unit 104. It should be noted that in the following description, the automatic document feeding unit 101 will be referred to as the ADF 101.

In the image forming apparatus 100, when a user places originals on an original tray 102 of the ADF 101 and uses an operating unit 326 in FIG. 3, which will be described later, to issue an instruction to start reading, a controller unit 321 in FIG. 3, which will be described later, sends an original reading instruction to the image reading unit 103. In accordance with the received original reading instruction, the image reading unit 103 feeds the originals one by one from the original tray 102 of the ADF 101 and reads the originals. The image forming apparatus 100 is also capable of reading an original placed on an original platen glass 221 in FIG. 2, which will be described later.

The image reading unit 103 causes an illumination lamp (not shown) to emit light and inputs reflected light, which has been obtained by scanning an image on an original by exposing it to light, to a linear image sensor (CCD sensor) (not shown), thus converting information of the image into an electric signal. The image reading unit 103 also converts the electric signal thus obtained into a luminance signal comprised of colors R, G, and B and outputs the luminance signal as image data to a controller unit 321, which will be described later.

The image forming unit 104 is an image forming device that forms the image data received from the controller unit 321, which will be described later, on a sheet. In the present embodiment, an electrophotographic method using a photosensitive drum (not shown) and a photosensitive belt (not shown) is adopted as an image forming method. The image forming unit 104 has a sheet feeding unit 105, a sheet discharging unit 106, and a finisher unit 107. The sheet feeding unit 105 has a plurality of cassettes storing sheets of different sizes in different orientations. Printed matter is discharged to the sheet discharging unit 106 and the finisher unit 107.

Figure 2:
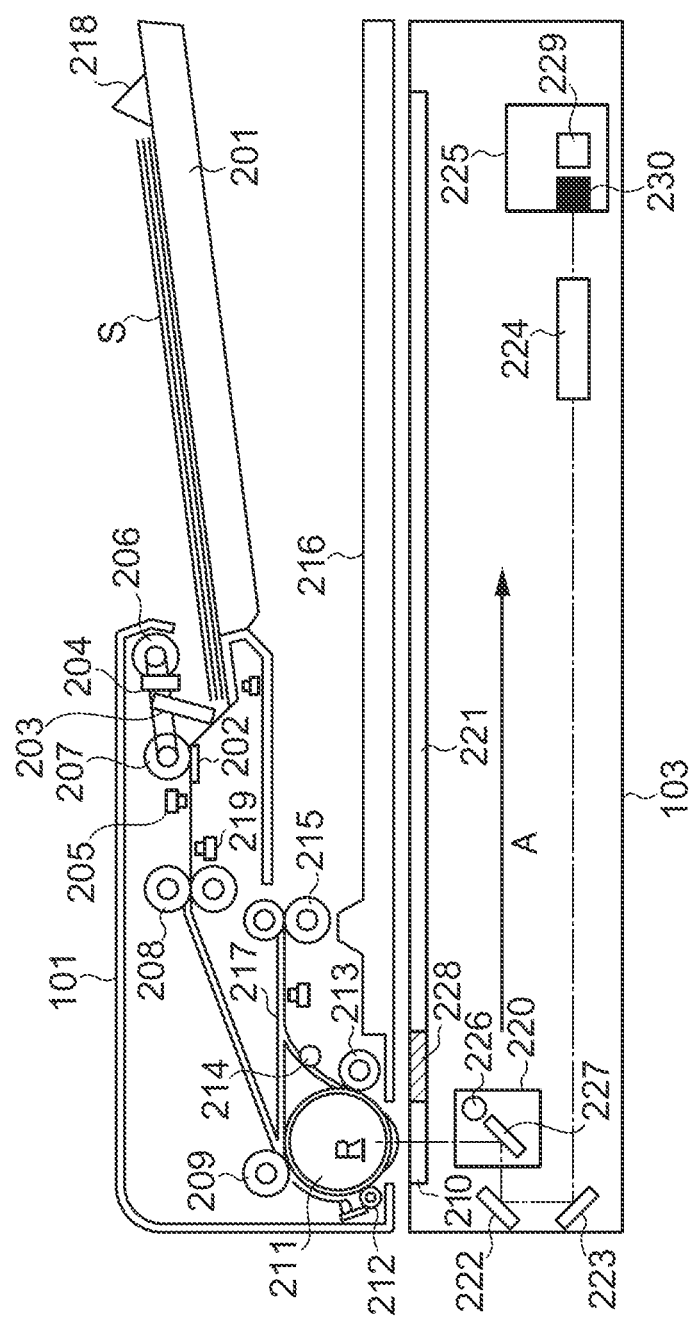
FIG. 2 is a cross-sectional view schematically showing arrangements of an ADF and an image reading unit in FIG. 1.

FIG. 2 is a cross-sectional view schematically showing arrangements of the ADF 101 and the image reading unit 103 in FIG. 1. It should be noted that in FIG. 2, their internal arrangements are seen through for ease of understanding.

Referring to FIG. 2, the ADF 101 has an original tray 201, a separation pad 202, an original detecting sensor 203, a ranging sensor 204, a separation sensor 205, and a sheet feeding roller 206. A batch of originals S comprised of one or more sheets is stacked on the original tray 201. The separation pad 202 prevents the batch of originals S from jutting out the original tray 201 and moving downstream before conveyance thereof is started. The original detecting sensor 203 detects placement of originals on the original tray 201. The ranging sensor 204 measures the distance from the uppermost surface of the batch of originals S. The separation sensor 205 detects that an original has passed the separation roller 207.

The sheet feeding roller 206 moves down to and rotates on a surface of the batch of originals S stacked on the original tray 201. As a result, the uppermost one of the originals conveyed by the sheet feeding roller 206 is separated from the other ones by the action of the separation roller 207 and the sheet feeding roller 206. The separation is implemented via, for example, a retard separation technique. It should be noted that in a case where the separation sensor 205 has detected no original for a predetermined time period (t1) since the start of conveyance, the ADF 101 stops driving the sheet feeding roller 206 and others. The predetermined time period (t1) is determined with consideration given to a time period required for an original to reach the separation sensor 205 after the start of conveyance and a delay estimated based on a conveying speed.

The original separated by the action of the separation roller 207 and the separation pad 202 is conveyed to a registration roller 209 by conveying rollers 208 and abuts against the registration roller 209. This loops the original to correct for a skew of the original being conveyed. A sheet feeding path on which the original that has passed the registration roller 209 is conveyed toward a flow reading glass 210 is located downstream of the registration roller 209.

The original that has been conveyed to the sheet feeding path is conveyed onto a platen by a large roller 211 and a conveying roller 212. The large roller 211 comes into contact with the flow reading glass 210. The original that has been conveyed by the large roller 211 passes a conveying roller 213, moves between a roller 214 and a moving glass and is discharged onto a discharged original tray 216 via a sheet discharging flapper and sheet discharging rollers 215.

In the present embodiment, the ADF 101 reads an image on a reverse side of an original by flipping it upside down. The ADF 101 moves the original to an inverting path 217 by reversing the rotating direction of the sheet discharging rollers 215 and switches the sheet discharging flapper while keeping the original held between the sheet discharging rollers 215. Skewing of the original during conveyance is corrected for by causing the moved original to abut against the registration roller 209 via the inverting path 217 and looping the original again. After that, the ADF 101 causes the conveying roller 212 and the large roller 211 to move the original to the flow reading glass 210 again so that the reverse side of the original can be read by the flow reading glass 210.

The original tray 201 is equipped with a guide restriction plate 218 that is capable of sliding in a sub scanning direction of the stacked batch of originals S, and an original width sensor (not shown) that detects a width of the originals S in response to movement of the guide restriction plate 218. A size of the batch of originals S stacked on the original tray 201 is determined by the original width sensor and a pre-registration sensor 219. An original length detection sensor (not shown) provided on a conveying path of the ADF 101 detects an original length based on a distance over which an original is conveyed until its trailing end is detected after its leading end is detected. The original size is determined based on the original length and the result of detection by the original width detection sensor.

The image reading unit 103 optically reads image information recorded on the original placed on the original platen glass 221 by scanning it with an optical scanner unit 220 in the sub scanning direction (see an arrow A in FIG. 2). It should be noted that originals placed on the ADF 101 are conveyed one by one to a reading center position in the ADF 101. At this time, the optical scanner unit 220 is moved to the reading center position to read the original at the reading center position. Originals placed on the ADF 101 or an original placed on the original platen glass 221 is read by an optical system. The optical system is comprised of the flow reading glass 210, the original platen glass 221, the optical scanner unit 220, mirrors 222 and 223, a lens 224, and a CCD sensor unit 225. The optical scanner unit 220 is equipped with a lamp 226 and a mirror 227. The image information read by the optical system is subjected to photoelectrical conversion and output as image data to the controller unit 321, which will be described later. A white board 228 provided in the image reading unit 103 creates reference data for shading white level. In the present embodiment, The CCD sensor unit 225 is comprised of a color CCD 229 and a monochrome CCD 230.

Figure 3:
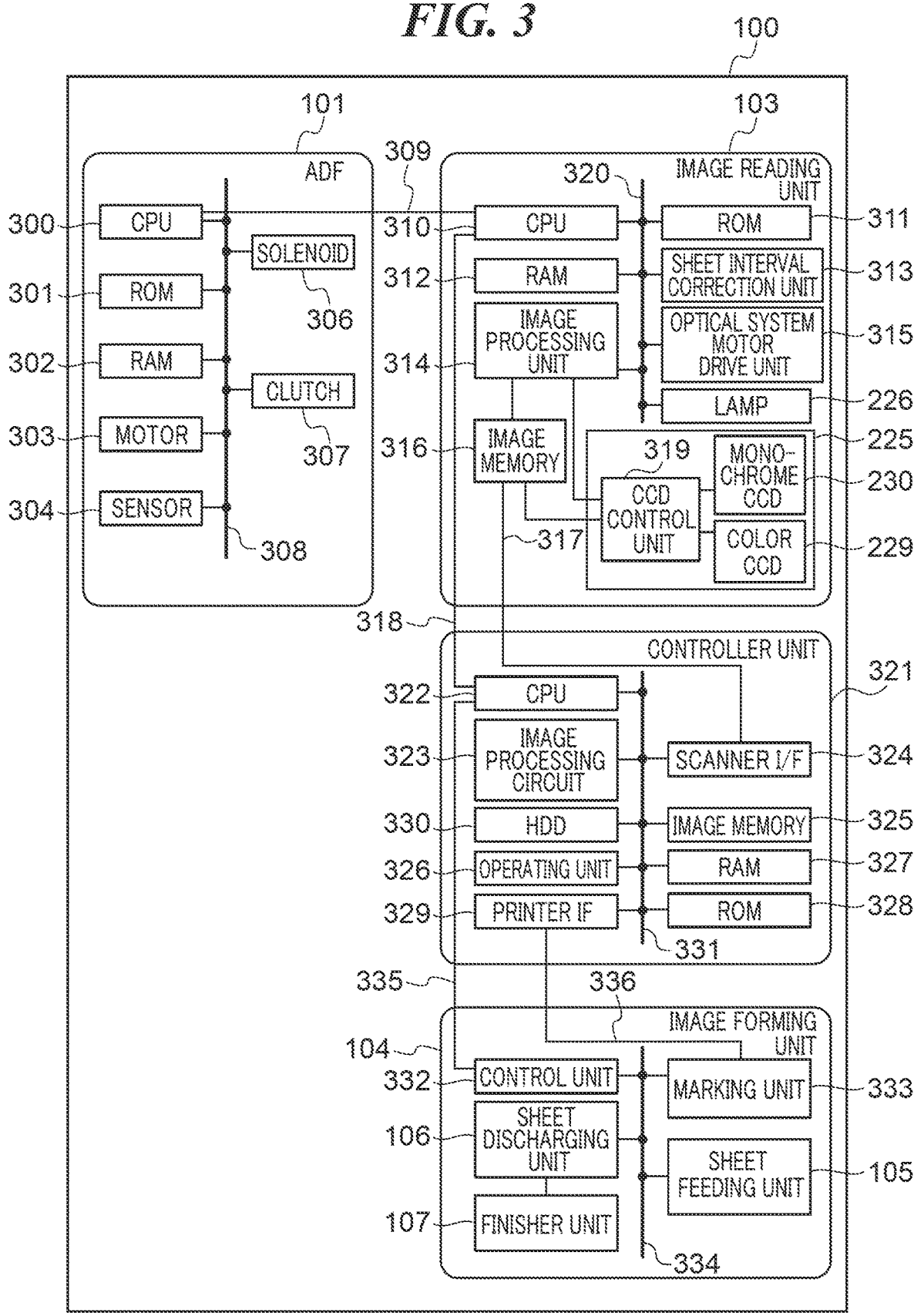
FIG. 3 is a block diagram schematically showing an arrangement of the image forming apparatus in FIG. 1.

FIG. 3 is a block diagram schematically showing an arrangement of the image forming apparatus 100 in FIG. 1. Referring to FIG. 3, the ADF 101 has a CPU 300, a ROM 301, a RAM 302, a motor 303, sensors 304, a solenoid 306, and a clutch 307. The CPU 300, the ROM 301, the RAM 302, the motor 303, the sensor 304, the solenoid 306, and the clutch 307 are connected to one another via a bus 308. The ADF 101 also has an input port (not shown) and an output port (not shown). The sensors 304 which represent the sensors in FIG. 2 are connected to the input port. The motor 303, the solenoid 306, and the clutch 307 which drive the rollers for conveyance in FIG. 2 are connected to the output port.

The CPU 300 controls sheet conveyance in accordance with a control program stored in the ROM 301. The CPU 300 carries out serial communications with a CPU 310 of the image reading unit 103 via a control communication line 309 and sends and receives control data to and from the image reading unit 103. For example, the CPU 300 sends an image leading-end signal, which is a reference for a leading end of original image data, to the image reading unit 103. The CPU 300 also receives control data from the CPU 310 of the image reading unit 103, and in accordance with the received control data, sends a result of detection by the sensor 304 to the image reading unit 103. The ROM 301 stores control programs and fixed parameters. The RAM 302 stores input data and work data.

The image reading unit 103 has the CPU 310, a ROM 311, a RAM 312, a sheet interval correction unit 313, an image processing unit 314, an optical system motor drive unit 315, a lamp 226, a CCD sensor unit 225, and an image memory 316. The CPU 310, the ROM 311, the RAM 312, the sheet interval correction unit 313, the image processing unit 314, the optical system motor drive unit 315, and the lamp 226 are connected to one another via a bus 320. The image processing unit 314 is connected to the CCD sensor unit 225 and the image memory 316.

The CPU 310 performs all types of control relating to the image reading unit 103. The ROM 311 stores programs. The RAM 312 is a nonvolatile storage device and is used as, for example, a work area for the CPU 310. The sheet interval correction unit 313 corrects a sheet interval. The optical system motor drive unit 315 is a driver circuit for driving an optical system drive motor. The CPU 310 carries out an image reading process by controlling the optical system motor drive unit 315 and causing the image processing unit 314 to control the CCD sensor unit 225.

To implement sheet conveyance, the CPU 310 sends a command relating to sheet conveyance control to the CPU 300 of the ADF 101. The CPU 300 that has received the command monitors the sensor 304 placed on the conveying path and drives the conveyance motor 303, the solenoid 306, and the clutch 307 to implement sheet conveyance. Thus, the CPU 310 controls sheet conveyance by the ADF 101 and image reading by the image reading unit 103.

An image signal that has passed the lens 224 and formed an image on the CCD sensor unit 225 is converted into digital image data. The digital image data thus obtained is subjected to various types of image processing by the image processing unit 314, such as a shading process and a process in which a streak in image data is detected and corrected for, and then written into the image memory 316. The data written into the image memory 316 is then sent to the controller unit 321 via an image communication line 317. An image leading-end signal, which is a reference for a leading end of original image data, has its notification timing adjusted by the CPU 310 and is sent to the controller unit 321 via a control communication line 318. Similarly, an image tip signal received from the ADF 101 has its notification timing adjusted by the CPU 310 and is sent to the controller unit 321 via the control communication line 318.

The CPU 310 controls the image processing unit 314. The CPU 310 controls the CCD sensor unit 225 by transmitting a control signal to the CCD sensor unit 225 via the image processing unit 314. In a process of scanning an original image with CCD sensor unit 225, the color CCD 229 and the monochrome CCD 230 read analog image signals. The line-by-line analog image signals that have been read are output to a CCD control unit 319. The CCD control unit 319 converts the received analog image signals into digital image data and outputs the digital image data to the image memory 316. The image memory 316 sends the received digital image data to the controller unit 321 via the image communication line 317.

The CPU 310 carries out serial communications with the CPU 322 of the controller unit 321 via the control communication line 318 and sends and receives control data to and from the controller unit 321. Based on the control data received from the CPU 322, the CPU 310 detects a shape abnormality of an original being conveyed. To detect a shape abnormality, the CPU 310 calculates a difference between a distance to the uppermost surface of the batch of originals S measured before the start of conveyance and a distance to the uppermost surface of the batch of originals S measured after the lapse of a predetermined time period (t2) since the start of conveyance with respect to each original. When the difference is equal to or longer than a predetermined distance (d1), the CPU 310 determines that the original has a shape abnormality and notifies the CPU 322 of the determination result.

The controller unit 321 controls the entire image forming apparatus 100 including the ADF 101, the image reading unit 103, and the image forming unit 104. The controller unit 321 has a CPU 322, an image processing circuit 323, a scanner I/F 324, an image memory 325, an operating unit 326, a RAM 327, a ROM 328, a printer I/F 329, and an HDD 330. The CPU 322, the image processing circuit 323, the scanner I/F 324, the image memory 325, the operating unit 326, the RAM 327, the ROM 328, the printer I/F 329, and the HDD 330 are connected to one another via a bus 331. The CPU 322 loads programs stored in the HDD 330 into the RAM 327 and executes the loaded programs. The RAM 327 is a nonvolatile storage device and is used as, for example, a work area for the CPU 322. The ROM 328 stores programs. The controller unit 321 stores image data, which is received from the image reading unit 103 via the image communication line 317, in the image memory 325.

The image processing circuit 323 converts the image data stored in the image memory 325 into an image. The image processing circuit 323 subjects the image data to, for example, a rotation process, a resolution conversion process, a zooming process, and a color space conversion process. The rotation process is a process in which an image comprised of 32×32 pixels is rotated through a designated angle. The resolution conversion process is a process in which a resolution of an image is converted. The zooming process is a process in which an image is zoomed in or out. The color space conversion process is a process in which a multi-valued input image is subjected to a matrix operation, and a YUV image is converted into a Lab image based on LUT. In the color space conversion process, base removal and show-through removal are implemented due to its 3×8 matrix operation and one-dimensional LUT. The image processing circuit 323 returns the converted image data back to the image memory 325.

Figure 4:
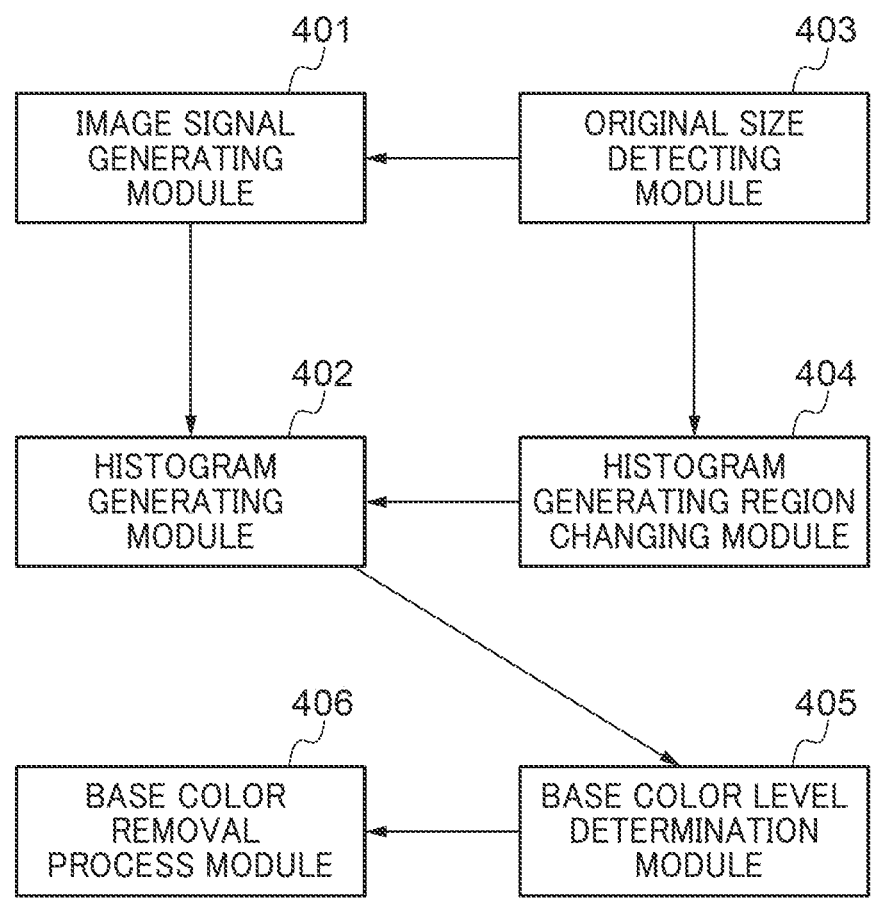
FIG. 4 is a function block diagram showing functions for implementing show-through removal by an image processing circuit in FIG. 3.

FIG. 4 is a function block diagram showing functions for implementing show-through removal in the image processing circuit 323 in FIG. 3. In the present embodiment, the image processing circuit 323 removes show-through by determining a base color level in image data, performing a computation for removing a base color corresponding to the base color level, and converting an input luminance value to an output luminance value. When an original is pulled into a feeder and starts to be read by the CCD sensor unit 225, an image signal generating module 401 converts the read image into a luminance signal and outputs the luminance signal to a histogram generating module 402. The histogram generating module 402 generates a histogram by extracting pixels at an arbitrary sampling pitch based on the received signal to count a luminance level. It should be noted that in a case where the original size has not been identified until the start of scanning, the image signal generating module 401 performs processing based on the greatest conceivable image length.

In the image processing circuit 323, when the original size is determined while an image signal is being generated, an original size detecting module 403 notifies a histogram generating region changing module 404 of the original size. The histogram generating region changing module 404 changes a region for image data sampled by the histogram generating module 402 to the original size which it has been notified of by the original size detecting module 403. After the original is scanned, a base color level determination module 405 determines a base color level from the histogram sampled by the histogram generating module 402. Based on the determined base color level, the base color level determination module 405 sets a base color removal coefficient in a base color removal process module 406. The base color removal process module 406 carries out a process in which it removes the base color from the image data based on the set coefficient.

Referring again to FIG. 3, the image forming unit 104 conveys a recording sheet, prints image data as a visible image on the recording sheet, and discharges printed matter from the image forming apparatus 100. The image forming unit 104 has a control unit 332 and a marking unit 333 as well as the sheet feeding unit 105, the sheet discharging unit 106, and the finisher unit 107 in FIG. 1. The control unit 332, the marking unit 333, the sheet discharging unit 106, and the sheet feeding unit 105 are connected to one another via a bus 334. The control unit 332 controls the image forming unit 104. When the marking unit 333 is ready to form an image, the control unit 332 sends an image tip signal to the controller unit 321 via the control communication line 335. The sheet discharging unit 106 has a function of discharges printed matter from the image forming apparatus 100. The marking unit 333 a function of transferring image data onto a sheet and fixing the same. The marking unit 333 transfers image data received via the image communication line 336 onto a sheet and fixes the same. The finisher unit 107 performs punching and sorting.

Figure 5:
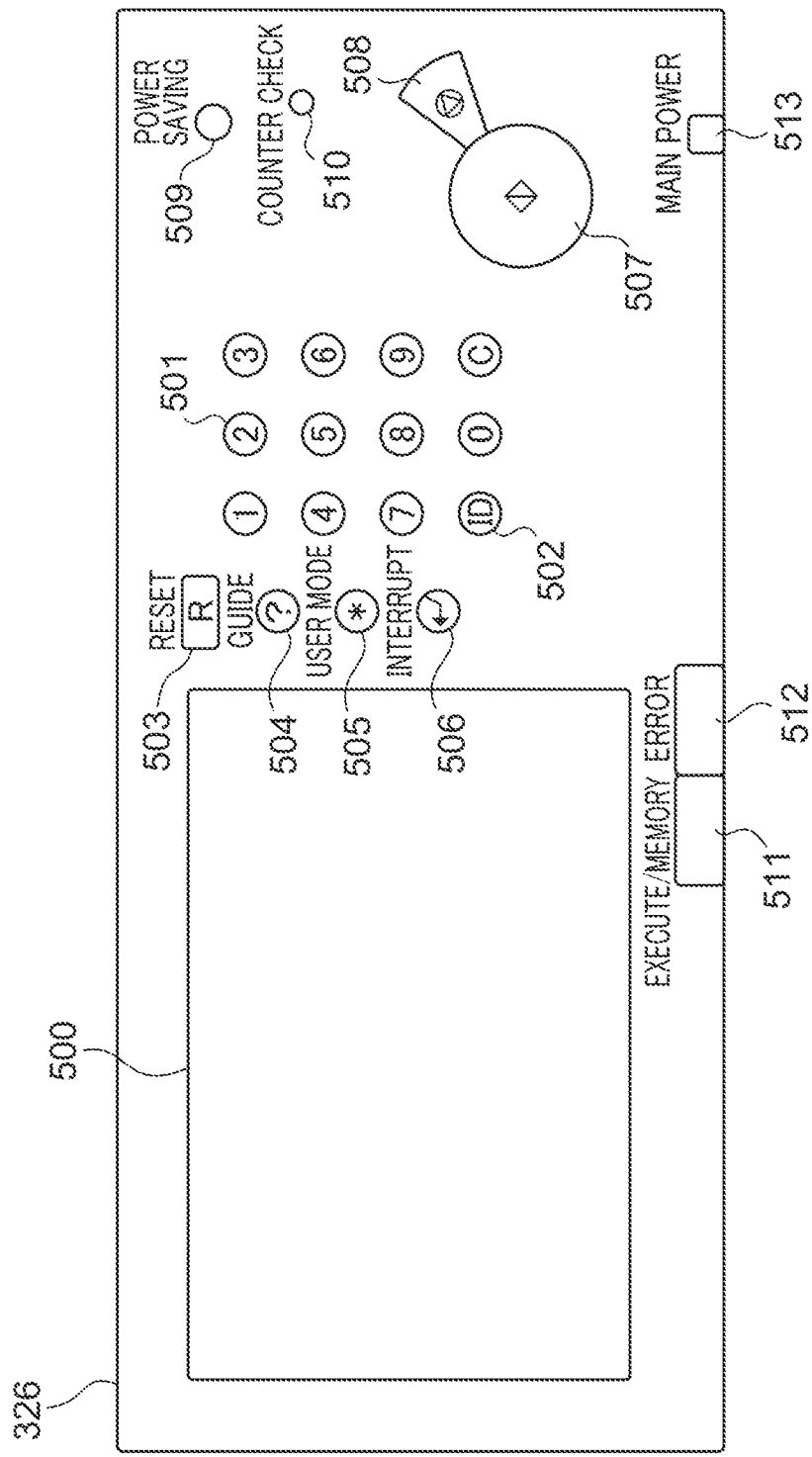
FIG. 5 is an external view of an operating unit in FIG. 3.

FIG. 5 is an external view of the operating unit 326 in FIG. 3. The operating unit 326 has an LCD touch panel 500, a numeric keypad 501, an ID key 502, a reset key 503, a guide key 504, a user mode key 505, an interrupt key 506, a start key 507, a stop key 508, a power saving key 509, a counter check key 510, an LED 511, an error LED 512, and a power LED 513.

The LCD touch panel 500 is an input device comprised of a liquid crystal display onto which a touch panel is attached. Functions for use in operating the image forming apparatus 100, image data, and so forth are displayed on the LCD touch panel 500. The numeric keypad 501 is comprised of hard keys for inputting numeric values from 0 to 9. The ID key 502 is used to input a division number and an encryption code in a case where the image forming apparatus 100 is managed on a division-by-division basis. The reset key 503 is a hard key for resetting a mode that has been set. The guide key 504 is a hard key for displaying screens explaining respective modes installed in the image forming apparatus 100. The user mode key 505 is a hard key for displaying a user mode screen on the LCD touch panel 500. On the user mode screen, user-specific settings on the image forming apparatus 100 can be configured.

The interrupt key 506 is a hard key for making an interrupt copy. The start key 507 is a hard key for starting copying or scanning. The stop key 508 is a hard key for canceling a job being executed. The power saving key 509 is a hard key for shifting the image forming apparatus 100 into a power saving state or returning the image forming apparatus 100 from the power saving state. The counter check key 510 is a hard key for displaying a count screen on the LCD touch panel 500. A result obtained by counting the number of copy sheets that have been used is displayed on the count screen. The LED 511 lights up when the image forming apparatus 100 is running, for example, when the image forming apparatus 100 is executing a job or carrying out a process in which it accumulates images in the image memory 325. The error LED 512 lights up when an error such as a paper jam or door open is occurring in the image forming apparatus 100. The power LED 513 lights up when a main switch of the image forming apparatus 100 is on.

Figure 6A:
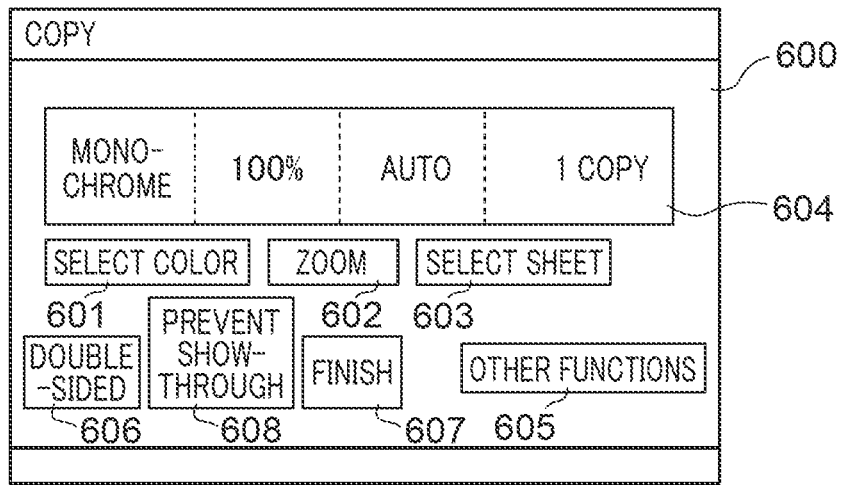
FIG. 6A is a view showing an example of a copy screen which is displayed on an LCD touch panel in FIG. 5.
Figure 6B:
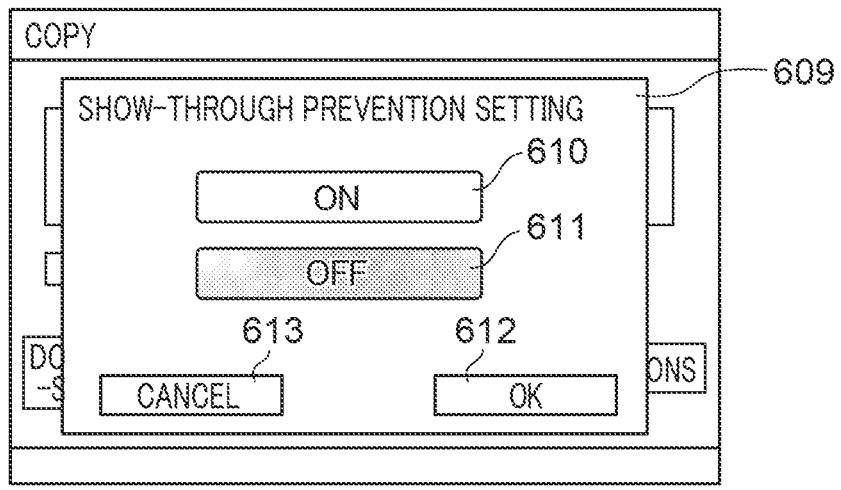
FIG. 6B is a view showing an example of a show-through prevention setting screen which is displayed on the LCD touch panel in FIG. 5.
Figure 6C:
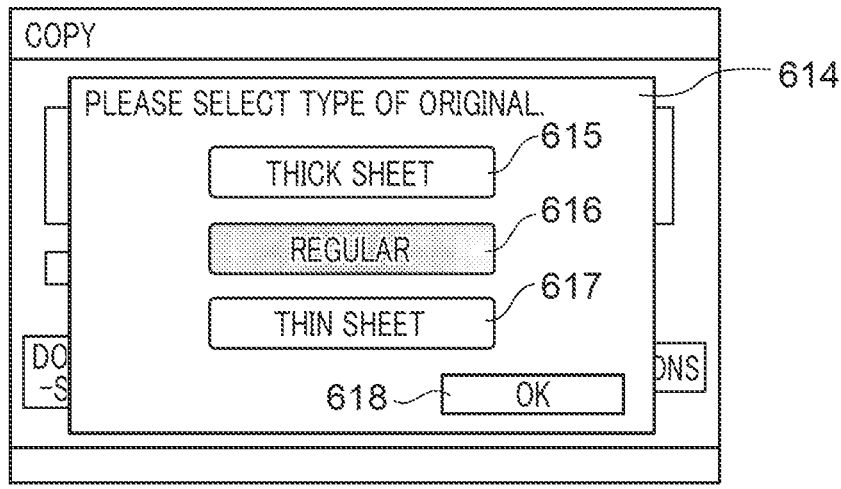
FIG. 6C is a view showing an example of a thickness selection screen which is displayed on the LCD touch panel in FIG. 5.

FIG. 6A is a view showing an example of a copy screen 600 which is displayed on the LCD touch panel 500 in FIG. 5. FIG. 6B is a view showing an example of a show-through prevention setting screen 609 which is displayed on the LCD touch panel 500 in FIG. 5. FIG. 6C is a view showing an example of a thickness selection screen 614 which is displayed on the LCD touch panel 500 in FIG. 5.

Referring to FIG. 6A, buttons for canine basic functions of the image forming apparatus 100, for example, a color selection button 601, a zoom button 602, and a sheet selection button 603 are placed on the copy screen 600. Setting statuses relating to functions corresponding to the respective buttons are displayed in a display field 604. Other function button 605 is also placed on the copy screen 600. By selecting the other function button 605, the user is able to configure settings on functions other than the basic functions, for example, settings on such function as page printing, page aggregation, and bookbinding. Shortcut buttons for calling functions frequently used by the user, for example, a double-sided button 606, a finish button 607, and a show-through prevention button 608 are also placed on the copy screen 600. The double-sided button 606 is a button for configuring settings on double-sided printing. The finish button 607 is a button for configuring settings on an output mode for printing and post-processing. The show-through prevention button 608 is a button for configuring settings on a show-through prevention function of preventing show-through when an original is read. When the user selects the show-through prevention button 608, the show-through prevention setting screen 609 in FIG. 6B is displayed in a manner overlapping the copy screen 600.

The show-through prevention setting screen 609 is comprised of an ON button 610, an OFF button 611, an OK button 612, and a cancel button 613. The ON button 610 is a button for enabling the show-through prevention function. The OFF button 611 is a button for disabling the show-through prevention function. When, for example, the user depresses the OK button 612 on the show-through prevention setting screen 609 in a state where the ON button 610 is selected, the show-through prevention function of the image forming apparatus 100 is enabled. When the user depresses the OK button 612 in a state where the OFF button 611 is selected, the show-through prevention function of the image forming apparatus 100 is disabled. On the other hand, when the user depresses the cancel button 613, the show-through prevention setting screen 609 is closed without the setting on the show-through prevention function being configured.

The thickness selection screen 614 in FIG. 6C is also displayed on the LCD touch panel 500 when the original detecting sensor 203 senses an original. On the thickness selection screen 614, a thickness of the original detected by the original detecting sensor 203 is set by the user. Buttons for setting a thickness of an original, for example, a thick sheet button 615, a regular button 616, and a thin sheet button 617 are placed on the thickness selection screen 614. It should be noted that in the present embodiment, a thickness of an original which corresponds to the thick sheet button 615 is, for example, 220 g/m$^2$, a thickness of an original which corresponds to the regular button 616 is, for example, 64 to 128 or 157 g/m$^2$, and a thickness of an original which corresponds to the thin sheet button 617 is, for example, 37, 42, or 52 g/m$^2$. An OK button 618 is also displayed on the thickness selection screen 614. When the user depresses the OK button 618 in a state in which any of the thick sheet button 615, the regular button 616, and the thin sheet button 617 is selected, a thickness corresponding to the selected button is set as the thickness of the original detected by the original detecting sensor 203.

Figure 7:
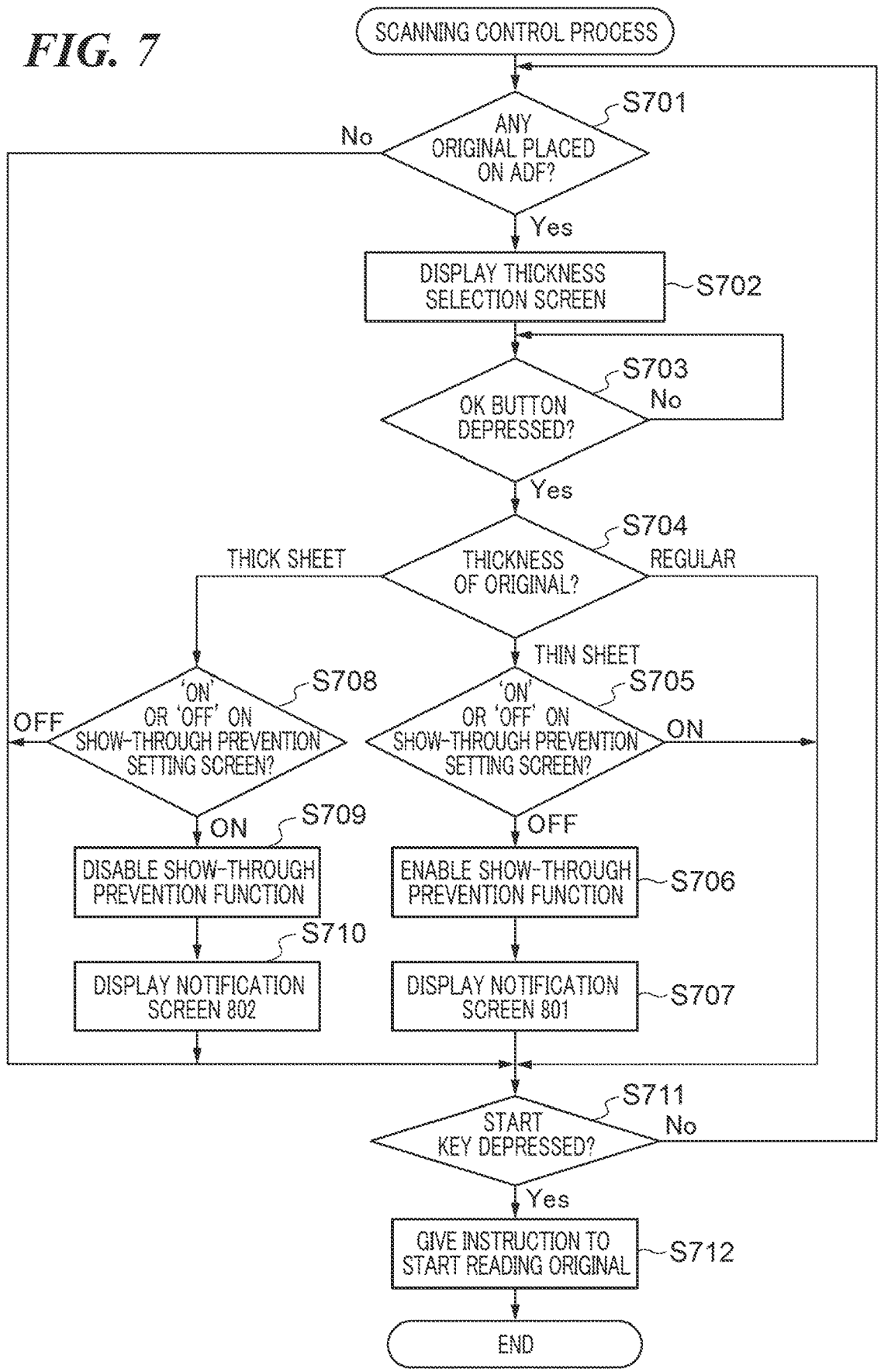
FIG. 7 is a flowchart showing the procedure of a scanning control process which is carried out by a controller unit in FIG. 3.

FIG. 7 is a flowchart showing the procedure of a scanning control process which is carried out by the controller unit 321 in FIG. 3. The process in FIG. 7 is implemented by the CPU 322 of the controller unit 321 executing a program expanded from the ROM 328 into the RAM 327. It is assumed that in the process in FIG. 7, the copy screen 600 is displayed on the LCD touch panel 500.

Referring to FIG. 7, based on a notification from the original detecting sensor 203, the CPU 322 determines whether or not any original is placed on the ADF 101 (step S701).

As a result of the determination in the step S701, when no original is placed on the ADF 101, the CPU 322 carries out a process in step S711, which will be described later. As a result of the determination in the step S701, when any original is placed on the ADF 101, the CPU 322 displays the thickness selection screen 614 on the LCD touch panel 500 (step S702). When the user depresses the OK button 618 on the thickness selection screen 614 (YES in step S703), the CPU 322 determines a thickness of the original placed on the ADF 101 (step S704). In the step S704, the CPU 322 determines the thickness of the original placed on the ADF 101 based on a thickness of the original set on the thickness selection screen 614.

As a result of the determination in the step S704, when the thickness of the original set on the thickness selection screen 614 is "Regular", the CPU 322 carries out the process in the step S711, which will be described later. As a result of the determination in the step S704, when the thickness of the original set on the thickness selection screen 614 is "Thin Sheet", the CPU 322 determines whether "ON" or "OFF" is selected on the thickness selection screen 614 (step S705).

Figure 8A:
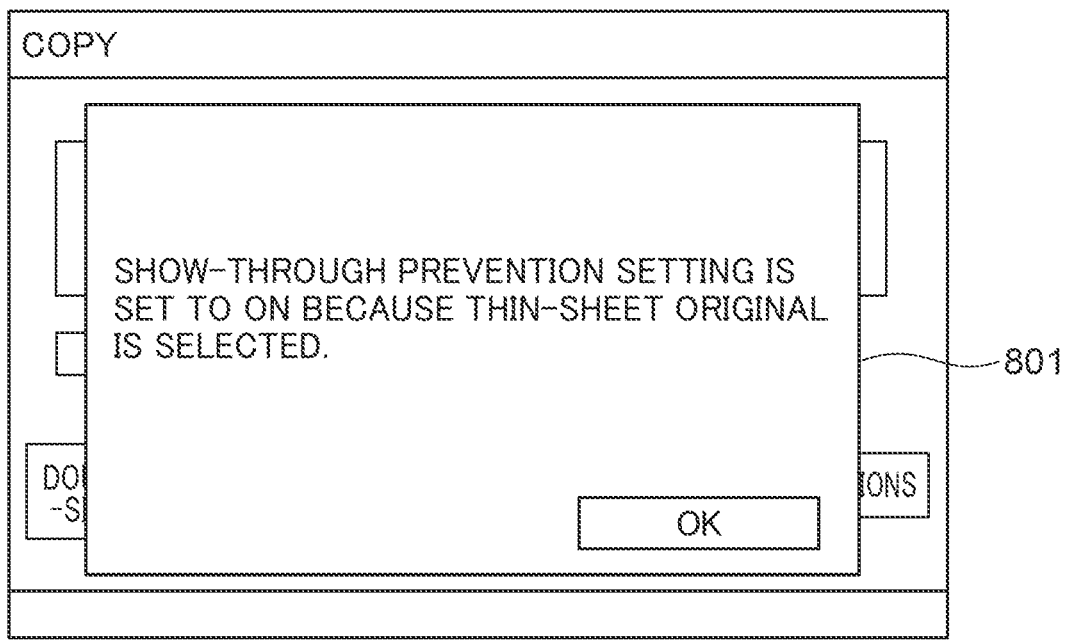
FIGS. 8A and 8B are views showing examples of a notification screen which is displayed on the LCD touch panel in FIG. 5.

As a result of the determination in the step S705, when "ON" is selected on the thickness selection screen 614, the CPU 322 carries out the process in the step S711, which will be described later, while keeping the show-through prevention function enabled. As a result of the determination in the step S705, when "OFF" is selected on the thickness selection screen 614, the CPU 322 enables the show-through prevention function because the show-through prevention function has been disabled (step S706). Namely, in the present embodiment, when an original detected by the original detecting sensor 203 is a thin sheet, the show-through prevention function is enabled irrespective of the setting on the thickness selection screen 614. Then, the CPU 322 displays a notification screen 801 n FIG. 8A, which indicates that the show-through prevention function has been enabled, on the LCD touch panel 500 (step S707). After that, the CPU 322 carries out the process in the step S711, which will be described later.

As a result of the determination in the step S704, when the thickness of the original set on the thickness selection screen 614 is "Thick Sheet", the CPU 322 determines whether "ON" or "OFF" is selected on the thickness selection screen 614 (step S708).

Figure 8B:
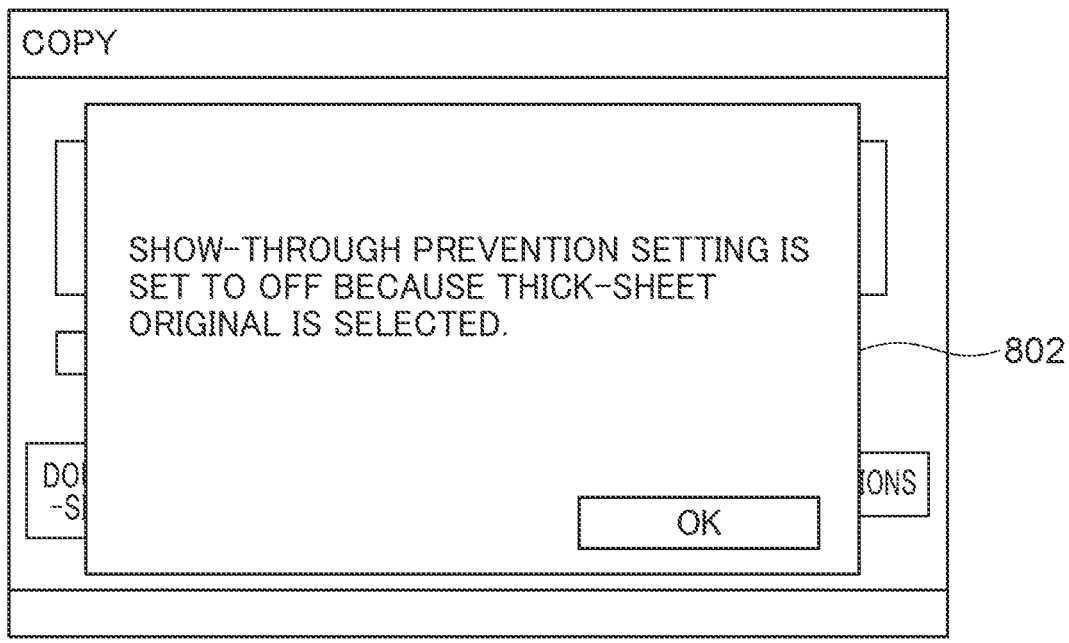

As a result of the determination in the step S708, when "OFF" is selected on the thickness selection screen 614, the CPU 322 carries out the process in the step S711, which will be described later, while keeping the show-through prevention function disabled. As a result of the determination in the step S708, when "ON" is selected on the thickness selection screen 614, the CPU 322 disables the show-through prevention function because the show-through prevention function has been enabled (step S709). Namely, in the present embodiment, when an original detected by the original detecting sensor 203 is a thick sheet, the show-through prevention function is disabled irrespective of the setting on the thickness selection screen 614. Thus, in the present embodiment, the show-through prevention function is controlled to be enabled or disabled based on the result of determination as to the thickness of the original in the step S704 irrespective of the setting on the thickness selection screen 614. Then, the CPU 322 displays a notification screen 802 in FIG. 8B, which indicates that the show-through prevention function has been disabled, on the LCD touch panel 500 (step S710). After that, the CPU 322 determines whether or not the user has depressed the start key 507 (step S711).

As a result of the determination in the step S711, when the user has not depressed the start key 507, the process returns to the step S701. As a result of the determination in the step S711, when the user has depressed the start key 507, the CPU 322 instructs the image reading unit 103 to start reading the original (step S712). In response to the instruction, the image reading unit 103 carries out a scanning process in FIG. 9. After that, the CPU 322 ends the present process.

Figure 9:
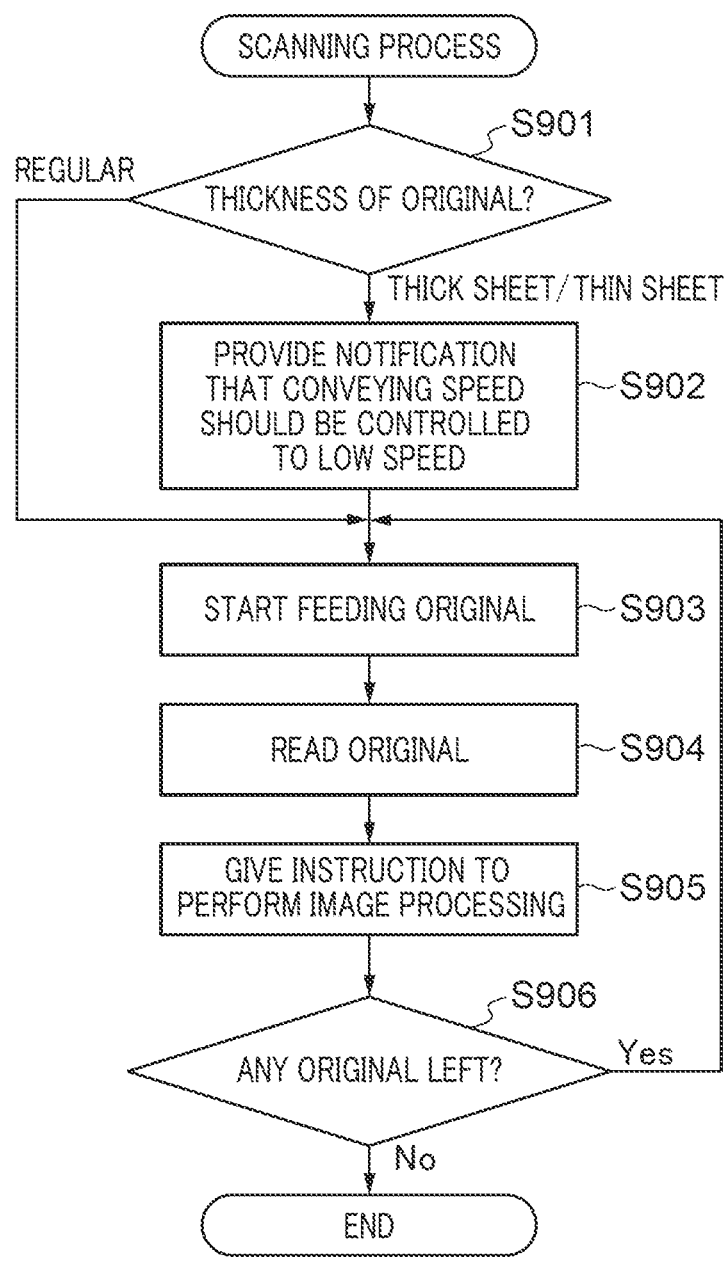
FIG. 9 is a flowchart showing the procedure of a scanning process which is carried out by the image reading unit in FIG. 3.

FIG. 9 is a flowchart showing the procedure of the scanning process which is carried out by the image reading unit 103 in FIG. 3. The process in FIG. 9 is implemented by the CPU 310 of the image reading unit 103 executing a program expanded from the ROM 311 into the RAM 312.

Referring to FIG. 9, the CPU 310 determines a thickness of an original placed on the ADF 101 (step S901). In the step S901, the CPU 310 determines the thickness of the original placed on the ADF 101 based on a thickness of the original set on the thickness selection screen 614 as with the step S704.

As a result of the determination in the step S901, when the thickness of the original set on the thickness selection screen 614 is "Regular", the CPU 310 carries out a process in step S903, which will be described later. As a result of the determination in the step S901, when the thickness of the original set on the thickness selection screen 614 is "Thick Sheet" or "Thin Sheet", the CPU 310 carries out a process in step S902. In the step S902, the CPU 310 provides a notification instructing the CPU 300 of the ADF 101 to control a conveying speed of the original to a low speed. In response to this notification, the CPU 300 reduces the RPM of the respective motors that drive the conveying rollers 208, the registration roller 209, the conveying roller 212, the conveying roller 213, the large roller 211, and the sheet discharging rollers 215 to a predetermined RPM. This controls the conveying speed of the original from a first speed set in advance, which is a normal speed, to a second speed that is the low speed. The second speed is set at, for example, a half of the first speed so as to enable the discharged original which is a thin sheet to entirely drop onto the discharged sheet tray 216 and prevent a torque shortage for the original which is a thick sheet in a curved area of the conveying path (conveying route) in the ADF 101.

Then, the CPU 310 starts feeding the original (step S903) and reads image data (step S904). The read image data is sent to the controller unit 321 and stored in the image memory 325 through the scanner I/F 324. After that, the CPU 310 instructs the controller unit 321 to perform image processing on the image data stored in the image memory 325 (step S905). In response to this instruction, the controller unit 321 performs various types of image processing on the image data stored in the image memory 325. For example, when the show-through prevention function is enabled, the controller 321 carries out show-through removal image processing in FIG. 10, which will be described later. The CPU 310 then determines whether or not any original is left on the original tray 201 (step S906).

As a result of the determination in the step S906, when any original is left on the original tray 201, the process returns to the step S903. As a result of the determination in the step S906, when no original is left on the original tray 201, the CPU 310 ends the present process.

Figure 10:
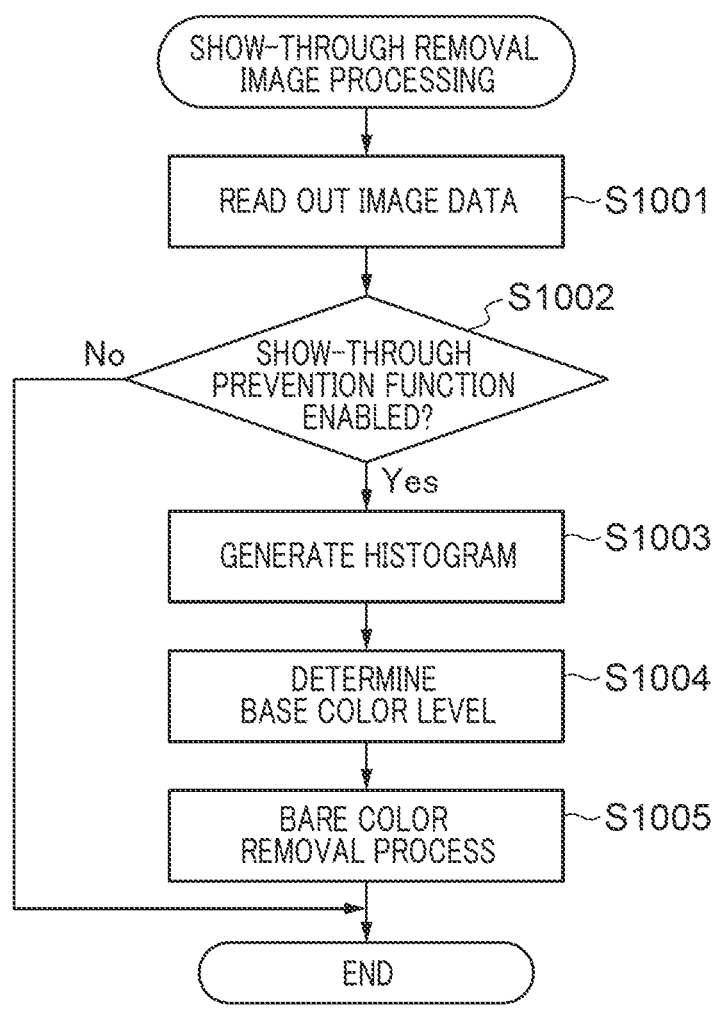
FIG. 10 is a flowchart showing the procedure of show-through removal image processing which is carried out by the controller unit in FIG. 3.

FIG. 10 is a flowchart showing the procedure of the show-through removal image processing which is performed by the controller unit 321 in FIG. 3. The process in FIG. 10 is implemented by the CPU 322 of the controller unit 321 executing a program expanded from the ROM 328 into the RAM 327.

Referring to FIG. 10, the CPU 322 reads the image data, which is stored in the image memory 325, via the scanner I/F 324 (step S1001). Next, the CPU 322 determines whether or not the show-through prevention function is enabled (step S1002).

Figure 11A:
FIGS. 11A to 11C are views useful in explaining how a base color level is determined in step S1004 in FIG. 10.
Figure 11B:
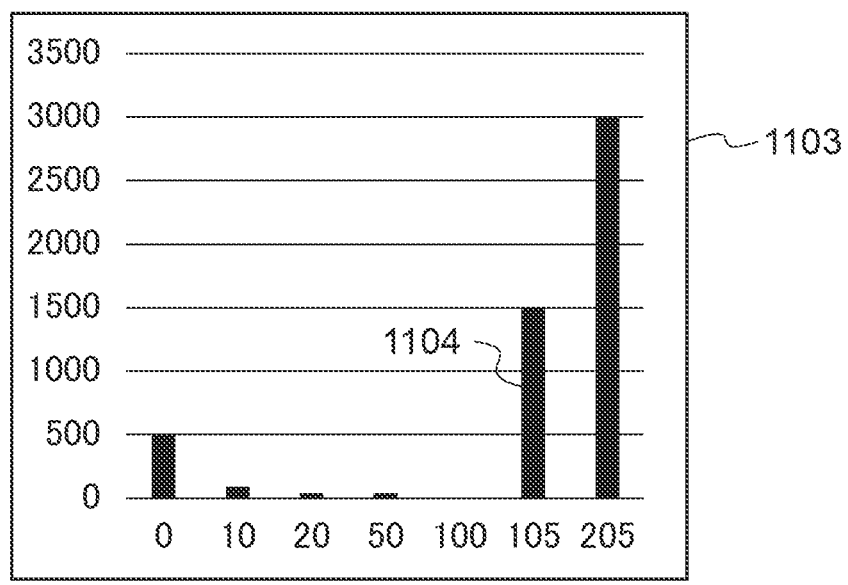
Figure 11C:
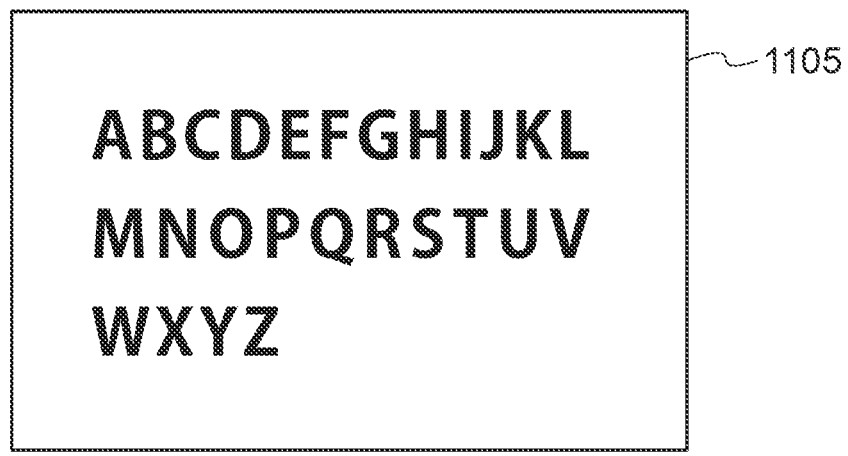

As a result of the determination in the step S1002, when the show-through prevention function is not enabled, the CPU 322 ends the present process. As a result of the determination in the step S1002, when the show-through prevention function is enabled, the CPU 322 generates a histogram from luminance levels of the image data (step S1003). Then, the CPU 322 determines a base color level based on the generated histogram (step S1004). FIG. 11A shows letters 1102 showing through in scanned-in image data 1101. When the read image data 1101 is comprised of a letter image on the front side and the show-through letters 1102, a histogram 1103 in FIG. 11B, for example, is generated. In the histogram 1103, the horizontal axis represents 0 to 255, and the vertical axis represents values obtained by counting pixels at corresponding luminance levels. The CPU 322 determines the base color level based on, for example, the histogram 1103. An area from which a luminance 255 at which the density is high and which is a background is removed, for example, a luminance level 195 designated by reference numeral 1104 in FIG. 11B is determined as the base color level. Then, the CPU 322 sets a coefficient for removing a base color based on the base color level determined in the step S1004. After that, the CPU 322 carries out a base color removal process based on the set coefficient (step S1005). As a result, the show-through letters 1102 are removed from the scanned-in image data 1101 to generate image data 1105 in FIG. 11C. The CPU 322 then ends the present process.

According to the embodiment described above, when an original detected by the original detecting sensor 203 is a thin sheet, the show-through prevention function is enabled. As a result, scanned-in image data is subjected to the show-through removal image processing, and this prevents output of show-through data. Moreover, in the embodiment described above, when an original detected by the original detecting sensor 203 is a thin sheet, the conveying speed of the original is controlled to the second speed lower than the first speed set in advance. As a result, a situation in which a trailing end of the original hits a leading end of a succeeding original is avoided while the original is being conveyed, and hence occurrence of errors such as a paper jam and poor stacking is prevented during conveyance of originals. Namely, according to the embodiment described above, output of show-through data is prevented while occurrence of a paper jam and poor stacking is prevented during conveyance of originals.

Furthermore, in the embodiment described above, when an original detected by the original detecting sensor 203 is a thick sheet, the show-through prevention function is disabled. This prevents unnecessary image processing from being performed so as to remove show-through from image data obtained by scanning in an original which is a thick sheet unlikely to show through. As a result, a situation in which a part of the scanned-in image data is lost due to the image processing is avoided. Moreover, in the embodiment described above, when an original detected by the original detecting sensor 203 is a thick sheet, the conveying speed of the original is controlled to the second speed. This prevents the load on the conveying rollers in the curved area of the conveying path of the ADF 101 from becoming excessively high when a thick original is being conveyed, and thus prevents occurrence of errors such as a paper jam and poor stacking while the thick original is being conveyed. Namely, in the embodiment described above, occurrence of a paper jam and poor stacking is prevented during conveyance of thick originals while a situation in which a part of image data is lost by unnecessary image processing is avoided.

In the embodiment described above, the show-through prevention function is controlled to be enabled or disabled based on a result of determination as to a thickens of an original in the step S704 irrespective of a setting made on the show-through prevention setting screen 609 by the user. As a result. even when the user has not appropriately configured a setting on the show-through prevention function or when the user has forgotten to configure the setting, the setting on the show-through prevention function is controlled to an appropriate setting suitable for a thickness of an original.

Furthermore, in the embodiment described above, in a case where the user selects the OFF button 611 on the show-through prevention setting screen 609, and an original detected by the original detecting sensor 203 is a thin sheet, the show-through prevention function is enabled. In this case, the notification screen 801 providing a notification that the show-through prevention function has been enabled is displayed on the LCD touch panel 500. On the other hand, in a case where the user selects the ON button 610 on the show-through prevention setting screen 609, and an original detected by the original detecting sensor 203 is a thick sheet, the show-through prevention function is disabled. In this case, the notification screen 802 providing a notification that the show-through prevention function has been disabled is displayed on the LCD touch panel 500. This notifies the user that for the show-through prevention function, a setting different from a setting made on the show-through prevention setting screen 609 by the user has been made, so that the user can recognize a setting status of the show-through prevention function.

It should be noted that a thickness of an original should not necessarily be set on the thickness selection screen 614, but may be set based on a result of detection by a sensor provided in the ADF 101. For example, a light transmitter and a light receiver may be placed on an original conveying path in a manner holding an original between them, and a thickness of the original may be determined based on the quantity of light received through the original by the light receiver. This saves the user from having to set a thickness via the operating unit.

Moreover, in the embodiment described above, there may be options other than a thick sheet, a regular sheet, and a thin sheet as choices for a thickness of an original to be selected. For example, "Postcard", "Coated Paper", and "Copy of Ledger Sheet" may be set. For "Postcard", the thickness can be set to a thick sheet, and for "Copy of Ledger Sheet", the thickness can be set to a thin sheet. As a result, even when the user does not know a thickness of an original, an appropriate thickness can be set based on a sheet type.

Furthermore, in the embodiment described above, a basis weight may be set when setting a thickness of an original. In a case where a sheet type of an original to be scanned is fixed, one of basis weights set in advance may be selected, or a basis weight may be input on the operating unit 326 when an original is scanned in. This makes it possible to accurately determine a thickness of the original based on the basis weight.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-204139, filed Oct. 30, 2018, which is hereby incorporated by reference herein in its entirety.

What is claimed is:

1. An image processing apparatus comprising;
   a document tray;
   a detector that detects that a document sheet has been placed on the document tray;
   a display that displays an object for receiving a thickness of the document sheet from a user in response to the detector detecting that the document sheet has been placed on the document tray;
   a user interface that receives the thickness of the document sheet by the object from the user;
   a controller that controls conveyance of the document sheet by a conveyor based on information that indicates the thickness of the document sheet and that is received by the user interface; and
   a reader that reads an image on the document sheet conveyed by the conveyor.

2. The image processing apparatus according to claim 1, wherein based on the information that indicates the received thickness of the document sheet, a show-through prevention function for the document sheet is enabled.

3. The image processing apparatus according to claim 2, wherein in a case where the received thickness of the document sheet is a first type, the show-through prevention function is not enabled for the document sheet, and in a case where the received thickness of the document sheet is a sheet thinner than the first type, the show-through prevention function for the document sheet is enabled.

4. The image processing apparatus according to claim 3, wherein in a case where the received thickness of the document sheet is the first type, the show-through prevention function for the document sheet is not enabled, and in a case where the set type of the document sheet is a sheet thicker than a second type thicker than the first type, the show-through prevention function for the document sheet is not enabled.

5. The image processing apparatus according to claim 2, further comprising a notification unit that provides a notification that the show-through prevention function for the document sheet has been enabled.

6. The image processing apparatus according to claim 1, wherein in a case where the received thickness of the document sheet is a first type, the controller causes the conveyer to convey the document sheet at a first conveying speed, and in a case where the received thickness of the document sheet is a sheet thinner than the first type, the controller causes the conveyer to convey the document sheet at a second conveying speed lower than the first conveying speed.

7. The image processing apparatus according to claim 1, wherein in a case where the received thickness of the document sheet is a first type, the controller causes the conveyer to convey the document sheet at a first conveying speed, and in a case where the received thickness of the document sheet is a sheet thicker than a second type thicker than the first type, the controller causes the conveyer to convey the document sheet at a third conveying speed lower than the first conveying speed.

8. The image processing apparatus according to claim 1, wherein the conveyer conveys the document sheet through a curved conveying path.

9. The image processing apparatus according to claim 1, further comprising a printer that prints an image read off the document sheet by the reader.

10. The image processing apparatus according to claim 1, further comprising a communicator that sends image data generated based on an image read off the document sheet by the reader.

11. A control method for an image processing apparatus including a document tray, the control method comprising:
   detecting that a document sheet has been placed on the document tray; and
   displaying an object for receiving a thickness of the document sheet from a user in response to the detecting that the document sheet has been placed on the document tray;
   receiving at a user interface the thickness of the document sheet by the object from the user;
   controlling conveyance of the document sheet by a conveyor based on information that indicates the thickness of the document sheet and that is received by the user interface; and
   reading an image on the document sheet conveyed by the conveyor.

12. A non-transitory computer-readable storage medium storing a program for causing a computer to execute a control method for an image processing apparatus including a document tray, the control method comprising:
   detecting that a document sheet has been placed on the document tray; and
   displaying an object for receiving a thickness of the document sheet from a user in response to the detecting that the document sheet has been placed on the document tray;
   receiving at a user interface the thickness of the document sheet by the object from the user;
   controlling conveyance of the document sheet by a conveyor based on information that indicates the thickness of the document sheet and that is received by the user interface; and
   reading an image on the document sheet conveyed by the conveyor.

* * * * *